US010180851B2

(12) United States Patent
Haag et al.

(10) Patent No.: US 10,180,851 B2
(45) Date of Patent: Jan. 15, 2019

(54) DETECTION OF UNAUTHORIZED USE OF VIRTUAL RESOURCES

(71) Applicant: Cisco Technology, Inc., San Jose, CA (US)

(72) Inventors: Jeffrey David Haag, Raleigh, NC (US); Earl Hardin Booth, III, Raleigh, NC (US); James Ronald Holland, Jr., Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 561 days.

(21) Appl. No.: 13/740,441

(22) Filed: Jan. 14, 2013

(65) Prior Publication Data

US 2014/0201732 A1  Jul. 17, 2014

(51) Int. Cl.
*G06F 9/455* (2018.01)
*G06F 21/10* (2013.01)

(52) U.S. Cl.
CPC ...... *G06F 9/45533* (2013.01); *G06F 9/45558* (2013.01); *G06F 21/10* (2013.01); *G06F 2009/4557* (2013.01); *G06F 2009/45587* (2013.01)

(58) Field of Classification Search
USPC .......................................................... 718/1
See application file for complete search history.

(56) References Cited

U.S. PATENT DOCUMENTS

| | | | |
|---|---|---|---|
| 6,397,242 B1 | 5/2002 | Devine et al. | |
| 8,826,033 B1* | 9/2014 | Krishnaprasad et al. | 713/187 |
| 2005/0216757 A1* | 9/2005 | Gardner | G06F 21/50 |
| | | | 713/194 |
| 2012/0036515 A1* | 2/2012 | Heim | G06F 9/5088 |
| | | | 718/105 |
| 2012/0131573 A1* | 5/2012 | Dasari | G06F 9/45558 |
| | | | 718/1 |
| 2012/0158997 A1* | 6/2012 | Hsu | H04L 29/12028 |
| | | | 709/242 |
| 2012/0159634 A1* | 6/2012 | Haikney et al. | 726/25 |
| 2013/0097296 A1* | 4/2013 | Gehrmann et al. | 709/223 |

(Continued)

OTHER PUBLICATIONS

Wikipedia, "Weight function", May 29, 2012, waybackmachine.*

(Continued)

*Primary Examiner* — Wynuel S Aquino (57) ABSTRACT

In one implementation, an original physical profile file and a configuration baseline are stored for a virtual machine. The physical profile file includes physical characteristics of a physical device running the virtual machine. The configuration baseline includes configuration settings or attributes of the instance of the virtual machine. A network device detects current value for at least one physical characteristic and compares the current value to the original physical profile file. When the current values deviate enough from the original physical profile file to exceed a threshold amount of deviation that is permissible, the network device determines that the virtual machine has been moved to another physical device. In response, the network device monitors current configuration settings or attributes with respect to the configuration baseline in order to detect an unauthorized usage of the virtual machine.

20 Claims, 7 Drawing Sheets

(56) References Cited

U.S. PATENT DOCUMENTS

2013/0198355 A1\* 8/2013 Kalyanaraman ........ H04L 67/34
709/223
2013/0346973 A1\* 12/2013 Oda ...................... G06F 9/5088
718/1

OTHER PUBLICATIONS

Alex Galis et al. "Position Paper: Service Clouds as Future Internet Service Offers", Draft 1.1, Jan. 16, 2009.
CDW, "Server Virtualization: Growth in Virtualization Continues to Reshape the Data Center Landscape, Consolidating Servers, Boosting Utilization and Improving Manageability." Published Nov. 11, 2011.
SafeNet, "Understanding the Challenges of Platform Virtualization", Accessed Nov. 1, 2012.
SafeNet, "Software Licensing in Virtual Environments—Managing the Terms of Software Use in Virtualized Systems", 2008.
VmWare, "ISV Licensing in Virtualized Environments", 2008.

\* cited by examiner

DETECTION OF UNAUTHORIZED USE OF VIRTUAL RESOURCES

TECHNICAL FIELD

This disclosure relates in general to the field of virtualization of computing and, more particularly, to detection of unauthorized usage of virtual resources.

BACKGROUND

Virtualization is the abstraction of computing resources. Virtualization defines a virtual equivalent of an actual hardware or software component. Hardware virtualization may simulate a platform, a storage device, a network resource, an operating system or another component. A virtual machine is a software instance that acts similar to a physical computer with an operating system. The virtual machine may execute software separated from the underlying hardware.

Hardware virtualization involves host machines and guest machines. A host machine is the physical machine on which the hardware virtualization occurs. A guest machine is the virtual machine created by the host machine. Hardware resources may be separated in hardware virtualization into virtualized infrastructure services such as CPU, memory, and storage.

The separation of the operating system from the physical hardware made possible in virtualization allows multiple guest machines to run on a single host machine. However, virtualization introduces new challenges in software copy protection and the authorized use of virtual resources.

BRIEF DESCRIPTION OF THE DRAWINGS

Exemplary embodiments of the present embodiments are described herein with reference to the following drawings.

DESCRIPTION OF EXAMPLE EMBODIMENTS

Overview

In one example, a method includes identifying a migration of a virtual machine and accessing a configuration characteristic of the virtual machine based on the migration of the virtual machine. The configuration characteristic of the virtual machine is compared to an expected value for the configuration characteristic. When the configuration characteristic of the virtual machine differs from the expected value for the configuration characteristic, data indicative of an error is generated.

In another example, an apparatus includes at least a storage device and a controller. The storage device is configured to store a physical fingerprint of a network device associated with a virtual machine and a configuration profile associated with operation of the virtual machine. The controller is configured to monitor at least one physical characteristic as received from the virtual machine and identify a migration of the virtual machine when the at least one physical characteristic deviates from the physical fingerprint. The controller is further configured to monitor a configuration characteristic of the virtual machine and identify unauthorized usage of the virtual machine when the configuration characteristic deviates from the configuration profile.

In another example, a non-transitory computer readable medium containing instructions to access a reference physical profile file for a virtual machine including physical characteristics of a physical device running the virtual machine, detect a current value for at least one physical characteristic, and compare the current value to the reference physical profile file. In response to a difference between the current value and the original physical profile file, at least one configuration characteristic of the virtual machine is compared to a baseline configuration.

Example Embodiments

The following embodiments detect the unauthorized use of a virtual machine or the unauthorized migration of a virtual machine from one physical server to another physical server. An original physical profile of a virtual machine is stored. When detected conditions significantly deviate from the physical profile, the virtual machine is deemed to have moved servers. To determine whether the move to the new server is an unauthorized move, as opposed to an authorized move or normal virtualization migration, the configuration of the virtual machine is compared to a past configuration. If the configuration exceeds a compliance limit, a remediation action within the virtual machine may be executed. The remediation action may include disabling of features or services, or full or partial disabling of the virtual machine internally.

Software vendors employ a variety of measures to prevent or deter the unauthorized copying of software products. Internet product activation is one such measure in which a software product is authenticated through a connection through the Internet to an authentication server of the software vendor. In another example, a piece of hardware (e.g., a dongle) including a code must be coupled to the computer in order for the software to run. Other examples, such as manually entered product or registration keys and authentication files, also provide copy protection.

However, these copy protection measures are not effective in virtual machines. Illegal or unauthorized copying of software is difficult to prevent in virtualized environments. In addition, management tools for virtual environments include the capability for copying and cloning virtual machines. For example, a virtual machine may include a migration utility that enables the virtual machines to move from one physical server to another by copying the entire virtual machine to the new server. The migration may occur while the virtual machine is running and with zero downtime. Example migration utilities include vMotion of VMWare and XenMotion of Citrix.

A natural consequence of easily migrated virtual machines is the unauthorized copying of the operating system and other software loaded onto the virtual machine. For example, in the case of a virtualized router, a valid license may be installed and a copy may be exported using the management interface of the virtual machine. The copy including the valid license may be imported to multiple virtual machines. The following embodiments detect when a migration of a virtual machine or a copy of a virtual machine has occurred and analyzes the configuration of the new virtual machine to determine whether the new virtual machine is authorized.

Figure 1:
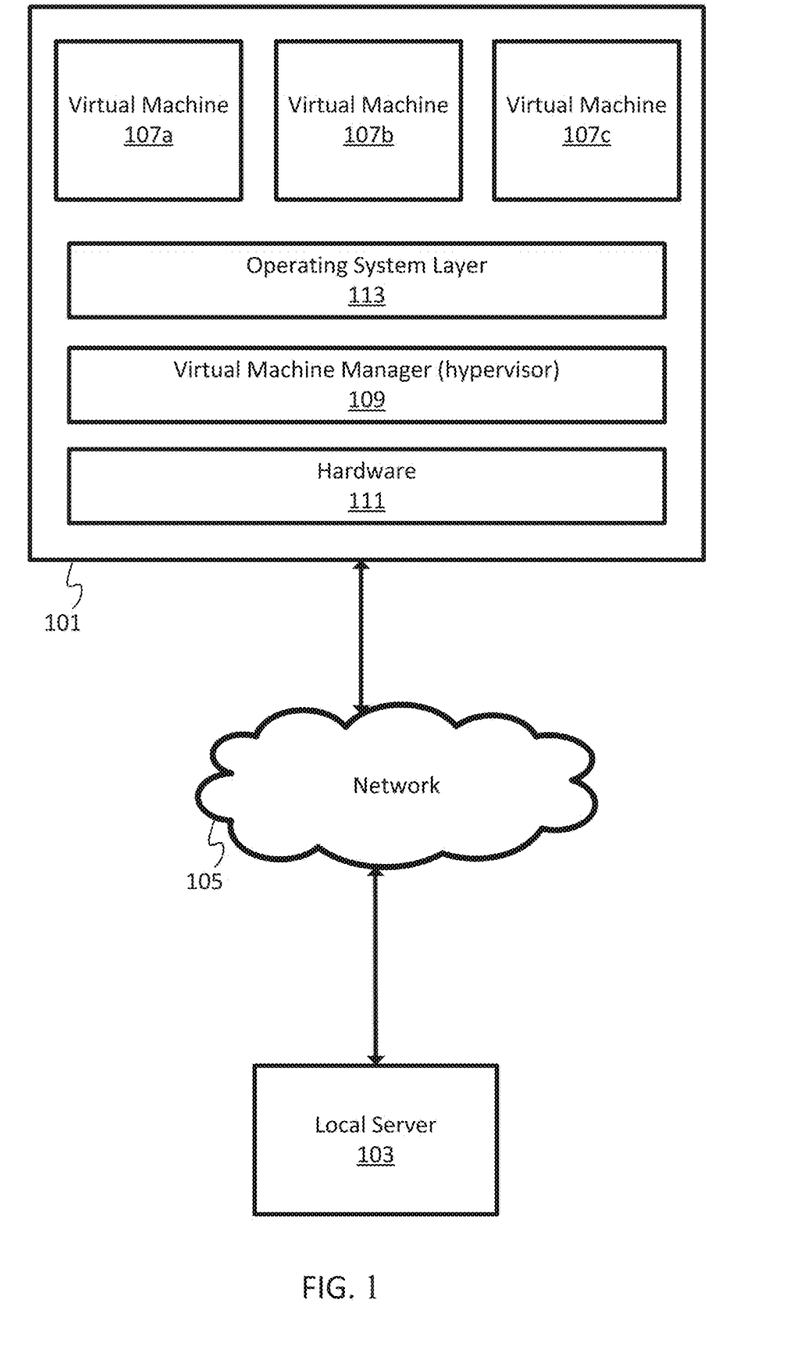
FIG. 1 illustrates an example of virtualization.

FIG. 1 illustrates an example of virtualization. A customer device, such as local server 103 communicates with the host 101 by way of network 105. The host environment includes virtual machines 107a-c, an operating system layer 113, a virtual machine manager 109 (e.g., hypervisor), and hardware 111. Additional, fewer, or different components may be included in the network 105 or as part of the host 101.

The host 101 may be a server or other network device running the hypervisor 109 as software. The server is physical hardware, including at least a processor and memory, configured to run virtual machines 107a-c through the hypervisor 109, which allows for the server to share physical resources such as the processor, the memory, and storage among the virtual machines 107a-b.

The hypervisor 109 provides a map between the virtual resources in virtual machines 107a-b and the physical resources of the server. The hypervisor 109 is configured to communicate directly with the underlying physical server hardware. The resources are assigned to the virtual machines 107a-c. The hypervisor 109 may be loaded on top of an operating system layer 113 running on the physical server hardware. The operating system layer 113 may be independent of the hypervisor 109. Alternatively, the hypervisor 109 is incorporated into the operating system layer 113.

The hypervisor 109 is capable of copying or cloning the virtual machines 107a-c. Often, the copying takes the form of moving a virtual machine from one physical server to another. The ease of such migration of virtual machines allows for consolidation of resources, which is one of the benefits of virtualization. As usage changes, virtual machines are moved to meet the demand.

Figure 2:
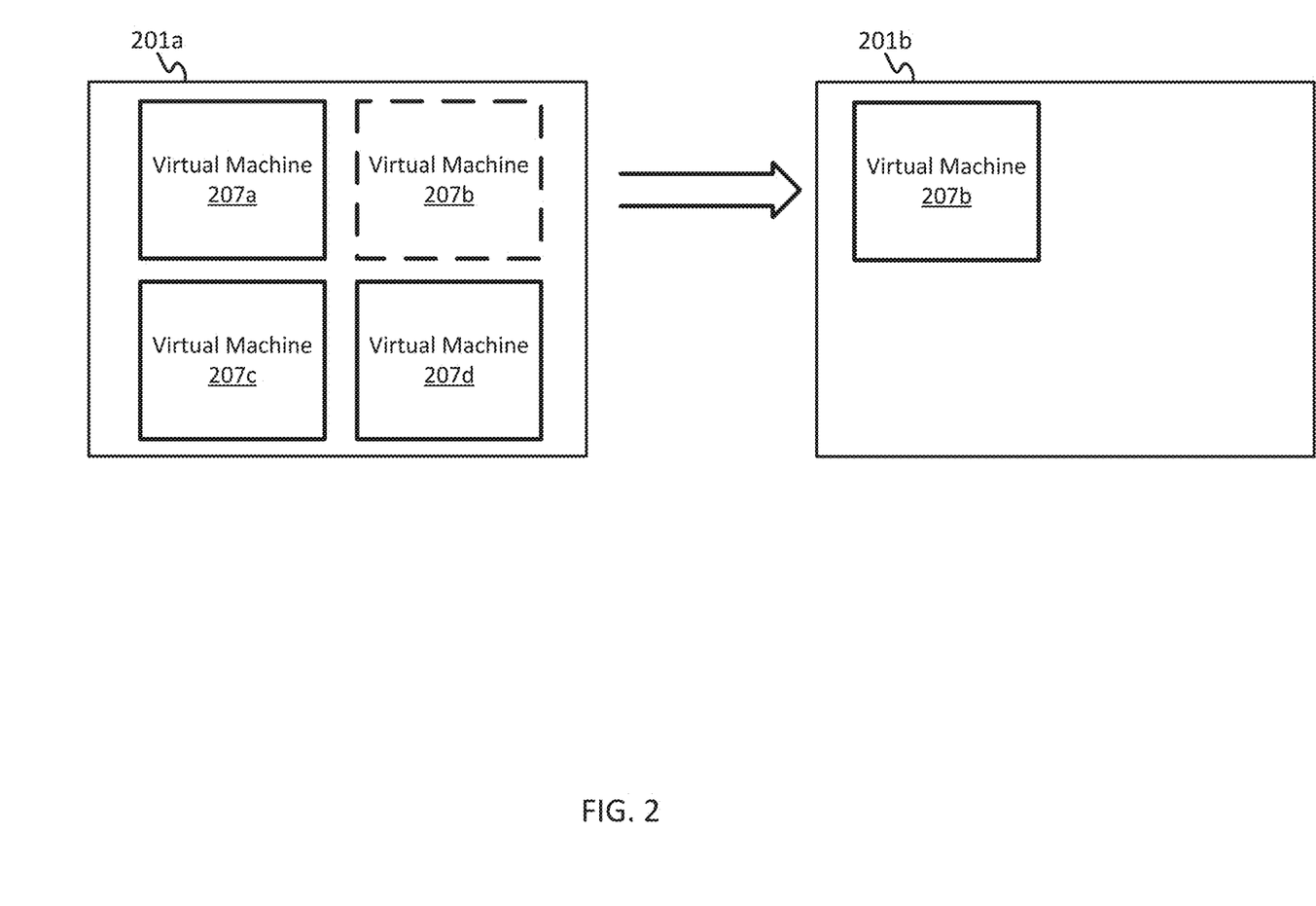
FIG. 2 illustrates an example of a virtual machine migration.

FIG. 2 illustrates an example of a virtual machine migration from network device 201a to network device 201b. Any number of virtual machines may be included in the network devices. A single physical server may implement over one hundred virtual machines. In a first state, a source such as the network device 201a includes virtual machines 207a-d. The virtual machine migration moves virtual machine 207b from the source to a destination such as network device 201b.

The hypervisor 109 may facilitate the virtual machine migration. For example, the hypervisor 109 may copy the contents of memory in the source to the destination. In one implementation, the virtual machine migration is a live migration in which the virtual machine 207b remains running on the network device 201a during the migration. Live migration allows a server administrator to move a virtual machine between different physical machines without disconnecting the client or application. The live migration involves the transfer of memory, storage, and network connectivity of the virtual machine from the source to the destination.

There may be an amount of time between when the virtual machine 207b ceases to run on the network device 201a and begins to run on network device 201b. The down time may range from less than 10 milliseconds to 10 to 100 seconds. A seamless live migration may be defined to include a down time that is less than a predetermined time (e.g., 1 second).

Virtual machine migrations may be authorized or unauthorized. Any license or software copy protection technique that merely ties the software to the underlying physical hardware can at best block both authorized and unauthorized migrations. The following embodiments distinguish between authorized and unauthorized migrations in order to provide for authorized virtual machine copies while preventing unauthorized virtual machine copies.

Figure 3:
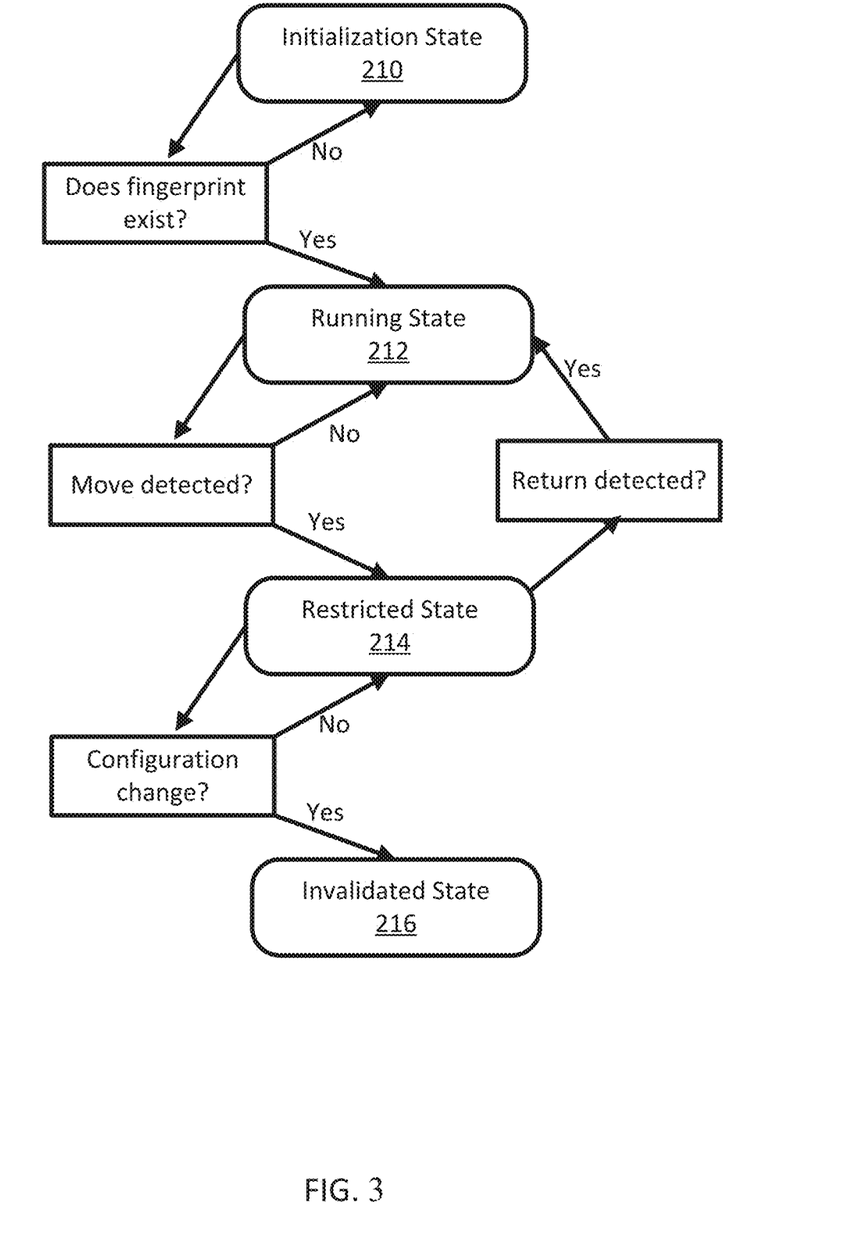
FIG. 3 illustrates states of a process to detect unauthorized usage of a virtual machine.

FIG. 3 illustrates states of a process to detect unauthorized usage of a virtual machine. The process to detect unauthorized usage includes at least four states: an initialization state 210, a running state 212, a restricted state 214 and an invalidated state 216. Other states may be included.

The network device begins in the initialization state 210. The initialization state 210 begins in response to powering on the network device, booting up the network device, a deployment of a virtual machine, or a redeployment or migration of a virtual machine. In the initialization state 210, the network device checks whether the physical profile has been stored. If the physical profile has not been stored, the physical profile is created. The physical profile is created from machine information such as physical identifiers of components of the network device (e.g., a model number or serial number of the processor) or other physical characteristic of the network device. The physical profile may be stored internally to the network device or sent to another server for storage.

If the physical profile has been stored or otherwise exists, the network device transitions to the running state 212. In the running state 212, the network device monitors at least one virtual machine implemented on the network device. The network device accesses a current value of at least one physical characteristic of the network device and compares the current value of the at least one physical characteristic to the stored physical profile including a stored value of the at least one physical characteristic. If the current value matches the stored value, no virtual machine migration is detected. If the current value differs from the stored value by a threshold level, a virtual machine migration is detected.

The threshold level may be any number of the physical characteristics that can change or a percentage of the physical characteristics that can change without a migration being indicated. The threshold level may be zero or any number of physical characteristics. The network device is configured to identify the migration of the virtual machine based on a difference between the current value of the physical characteristic and the stored value of the physical characteristic. The difference is determined as a number of the characteristics that are different, such as different processors, but a same memory and communications link indicating only one change where the threshold level is two or more changes.

The running state 212 may be subject to a running state timer. At each expiration of the running state timer, the network device periodically compares the current physical characteristics to the stored physical characteristics. The running state timer may be variable and set by a user input or fixed. Examples values of the running state timer set to 1 minute, 10 minutes, 1 hour, or 1 day.

When a virtual machine migration is detected, the network device moves to the restricted state 214. In the restricted state 214, the network device determines whether there has been a configuration change in the virtual machine. The network device accesses at least one configuration characteristic of the virtual machine. The configuration characteristic may be a setting or other variable set within the virtual machine. The configuration characteristic may be any parameter that varies depending on the deployment of the virtual machine. Configuration characteristics vary from deployment to deployment depending on the network locations, geographic locations, and local settings requirements.

In the restricted state 214, the network device compares the configuration characteristic of the virtual machine to an expected value for the configuration characteristic. The expected value may be based on a prior configuration, which is stored in memory. The prior configuration may be stored and indexed remotely at a server. When the configuration characteristics are changed more than a predetermined level, the network device generates data indicative of an error.

The restricted state 214 may be subject to a restricted state timer. At each expiration of the restricted state timer, the network device periodically compares the current configuration characteristics to the stored prior configuration characteristics. The restricted state timer may be variable and set by a user input or fixed. Examples values of the running state timer set to 1 minute, 10 minutes, 1 hour, or 1 day. The prior configuration characteristics may be continually updated in the running state 212, providing the best set of configuration characteristics to compare against upon entering the restricted state 214.

The network device moves to the invalidated state 216 based on the data indicative of an error or invalid state. A warning message or an error message, which do not change the operation of the network device or the virtual machine, may be sent when entering the invalidated state 216. The warning message or error message may be sent to an endpoint associated with the virtual machine. The endpoint may be an administrator device or an end user device. The error or warning information may change the operation of the network device by disabling the network device. For example, the network device may power itself off or delete the hard drive. In one alternative, the virtual machine may have administrative privileges at the hypervisor level, enabling the error data to change the operation of the virtual machine by instructing the hypervisor to delete the virtual machine or remove resources from the virtual machine.

The network device may also move from the restricted state 214 back to the running state 212 when a subsequent comparison of the at least one physical characteristic of the network device to the stored physical profile indicates that the virtual machine has moved back to the original server and/or back to other hardware with characteristics not violating the threshold level of change.

Figure 4:
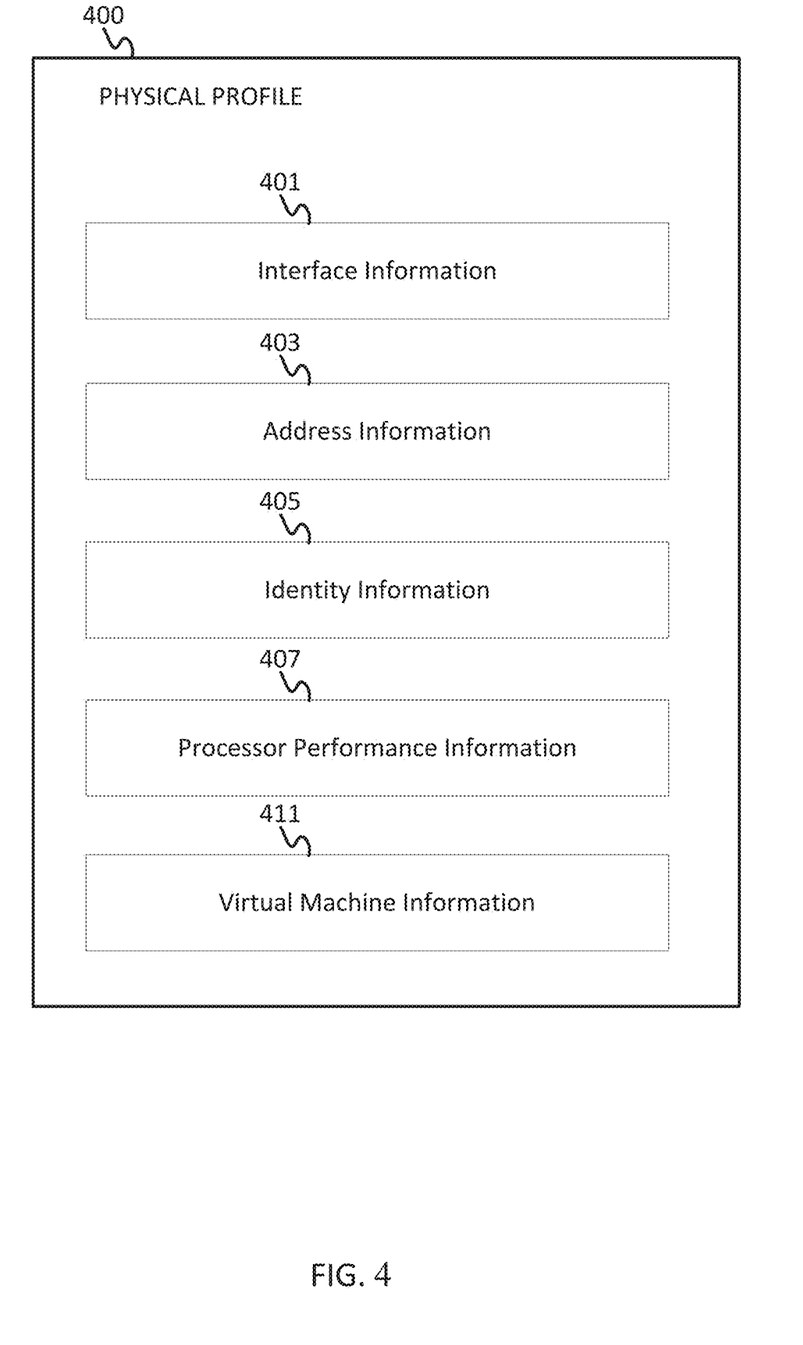
FIG. 4 illustrates an example physical profile for a virtual machine deployment.

FIG. 4 illustrates an example physical profile 400 for a virtual machine deployment. The physical profile 400 may be a footprint of the network device as seen by the virtual machine. The physical profile 400 includes data that identifies when the virtual machine has been moved to a different physical machine. The physical profile 400 may include data indicative of interface information 401, address information 403, identity information 405, processor performance information 407, and/or virtual machine information 411.

The interface information 401 may include the number of interfaces assigned to the virtual machine. When the virtual machine is provisioned, the virtual machine is assigned to one or more virtual interfaces. The virtual interfaces may be mapped to actual physical interfaces of the underlying network device and managed by the hypervisor. The interface information 401 may include a quantity of virtual interfaces, a quantity of physical interfaces, or both. Examples quantities include 1 to 20 interfaces. The interface information 401 may include identifiers of one or more of the interfaces. The address information 403 may include one or more media access control (MAC) addresses assigned to each interface.

The identity information 405 may identify the network device or the processor. To identify the network device, the identity information 405 may be a unique device identifier (UDI), which is a combination or concatenation of a model number and a serial number, or a combination of a product identifier, a version identifier, and a serial number.

When the identity information 405 identifies the processor of the underlying network device, the identity information 405 may include one or both of the central processing unit (CPU) model and the CPU serial number. The CPU model may include the vendor of the CPU and a series of the CPU. Examples CPU models include Intel Xeon and AMD Athlon. The CPU serial name may be an alphanumeric string that uniquely identifies a particular CPU. The identity information 405 may be retrieved from the file /proc/cpuinfo. Other values may be retrieved using cpuinfo and included in the identify information 405. Other information gathering processes may be used.

The processor performance information 407 may include one or more of the CPU clock speed, or the CPU bogomips. The CPU clock speed may be a measured value or a rated value. Example CPU measured clock speeds include 1595.353 MHz and 2392.276 MHz. Example CPU rated clock speeds include 1500 MHz and 2300 MHz. The CPU bogomips is an estimated measurement of CPU speed made in the Linux kernel, which also considers CPU cache. The processor performance information 407 may be retrieved from the file /proc/cpuinfo. Other values may be retrieved using cpuinfo and included in the processor performance information 407. Other information gathering processes may be used.

The virtual machine information 411 may include a virtual machine identification (VM_ID) or a hypervisor identification. The virtual machine information 411 may be a uniquely universal identifier (UUID) represented as a 128-bit string or integer.

Normally, the hypervisor accurately and truthfully reports information to the guest. However, the hypervisor may be configured to adjust some of the values used for interface information 401, address information 403, identity information 405, processor performance information 407, and/or virtual machine information 411. In order to guard against the risk of the hypervisor spoofing some values, the virtual machine may be required to communicate identification back to a centralized entity.

Figure 5:
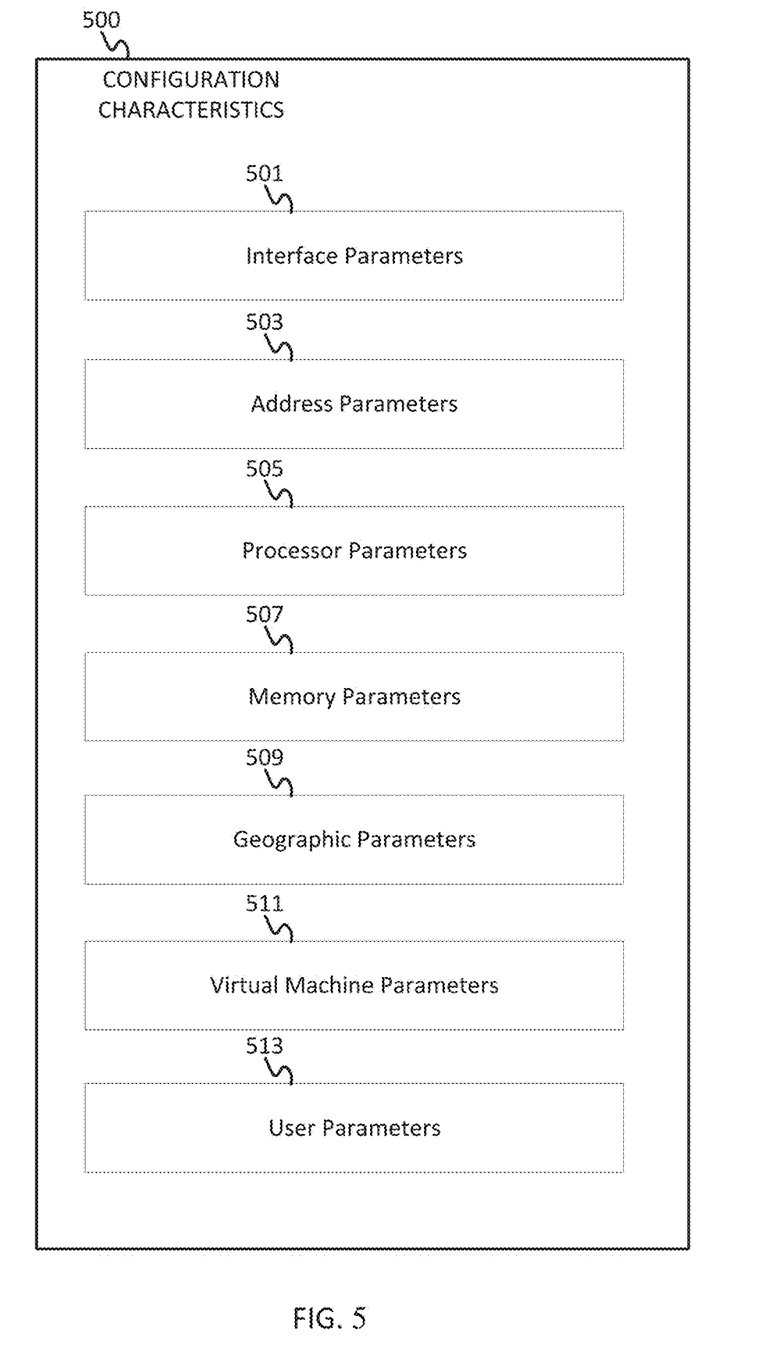
FIG. 5 illustrates an example configuration profile for a virtual machine deployment.

FIG. 5 illustrates an example configuration profile 500 for a virtual machine deployment. The configuration profile 500 includes data that determines whether virtual machine moves between physical servers are authorized. The configuration profile 500 may include data that, under normal operating conditions in a network, would not change from one server to the next. Therefore, the configuration parameters are not likely to change in authorized migrations of virtual machine but likely to change in unauthorized copies of virtual machines. The configuration parameters are likely to be changed when the virtual machine is copied to a new network and then configured for the settings of that network. The configuration profile 500 may include one or more of interface parameters 501, address parameters 503, processor parameters 505, memory parameters 507, geographic parameters 509, virtual machine parameters 511, and user parameters 513. The parameters are selected as indication that the virtual machine has been configured at a new location on a new network. New networks often require configuration changes because different network devices are being used. Installations of multiple copies of virtual machines or other software on different networks often violates the license, which may be for a single copy of the software. The following parameters indicate that the virtual machine is likely an unauthorized copy.

The interface parameters 501 include the number of interfaces or the IP addresses assigned to each interface. The interface parameters may include up to 20 addresses. The other address parameters 503 may include the hostname of the physical server.

The processor parameters 505 may include data indicative of the number of CPU cores allocated to the virtual machine. Examples include one, two, and ten processors. The memory parameters 507 may include data indicative of the amount of memory allocated to the virtual machine. Examples of the amount of memory include 2 gigabytes, 4 gigabytes, and 16 megabytes. The virtual machine parameters 511 may include other information specific to the virtual machine instance.

The geographic parameters 509 may include a geographic location of the physical server running the virtual machine or a time zone of the physical machine. The geographic location of the physical server may be estimated from an IP address or a service provider. The time zone of the physical machine may be retrieved from the network of the physical server.

The user parameters 513 include data set by a user. The user parameters 513 may be an enable password or an enable security secret set by the user for access to the virtual machine externally. The enable passwords and enable security secret are often set on the initial deployment of the virtual machine, and new deployments, with new users, may change the enable passwords and enable security secret.

When the network device detects that a virtual machine has been moved, the configuration information for the virtual machine is tracked. The network device determines that the move was unauthorized when the configuration information changes in an unexpected way by a predetermined level. The predetermined level may be set by the administrator according to a tradeoff between inconvenience for the customer and effectiveness of piracy prevention. A strict policy, including a low predetermined level, would permit little piracy to occur but cause more inconveniences for valid customers attempting authorized migrations. A lenient policy, including a high predetermined level, would not block many authorized migrations but may let more piracy occur. The changes may be measured in absolute terms (i.e., value A has changed) or in relative terms (i.e., value A should be B for a migration, but is C).

The predetermined level may be set according to an algorithm that weights the configuration parameters or a subset of the configuration parameters. Table 1 includes an example in which five of the configuration parameters are weighted equally. Unequal weighting may be used. The weights may be absolute values or percentages.

TABLE 1

| PARAMETER | WEIGHT |
| --- | --- |
| Number of Ethernet interfaces | 20 |
| Hostname | 20 |
| Total memory assigned to the virtual machine | 20 |
| IP Address on interface (per instance) | 20 |
| Time zone | 20 |

The predetermined level may be a compliance limit. For example, consider the example of Table 1 and a compliance limit of 40. Each of the configuration parameters that has changed counts against the compliance limit. If the compliance limit is exceeded, the configuration profile has changed too much, which indicates that the virtual machine migration was unauthorized. For example, if two of the configuration parameters in Table 1 have changed, but three have not, then the compliance level is 60. However, if three of the configuration parameters in Table 1 have changed, but two have not, then the compliance level is 40, which meets or falls below the compliance limit, indicating an unauthorized copy. The weights and compliance limits are configurable to any levels.

In another example, consider a stored set or initial set of the configuration parameters: Ethernet interfaces=3, ip address1=10.1.1.1, ip address2=10.2.2.2, ip_address3=10.3.3.3, hostname=Z1, time zone=PST, and total memory=2 GB. Initially if nothing changes, there is 140/140 or 100% compliance. If one configuration parameter changes, there are six unchanged, which provides (20*6)/140 or 85.7% compliance. If three configuration parameters change, there are four unchanged, which provides (20*4)/140 or 57.1% compliance. If four configuration parameters change, there are three unchanged, which provides (20*3)/140 or 42.9% compliance. If five of the configuration parameters change, there are two unchanged, which provides for (20*2)/140 or 28.6% compliance, falling below the compliance limit example above, and indicating noncompliance of the virtual machine.

When the virtual machine falls below the compliance level, an error message may be generated. The error message may be informative only, informing the local server or endpoint that unauthorized usage may have occurred. Alternatively, the error message may indicate that the virtual machine or software is being disabled. For example, the license of the software may be revoked or invalidated, the virtual machine may be bricked, or the virtual machine may be temporarily disconnected from the network. The license may be invalidated by changing the serial number assigned to the virtual machine. If the serial number no longer matches a serial number stored by the authorized virtual machine or physical server, the software may cease to operate. The virtual machine may be bricked by deleting the virtual machine or deleting the storage associated with the virtual machine.

Figure 6:
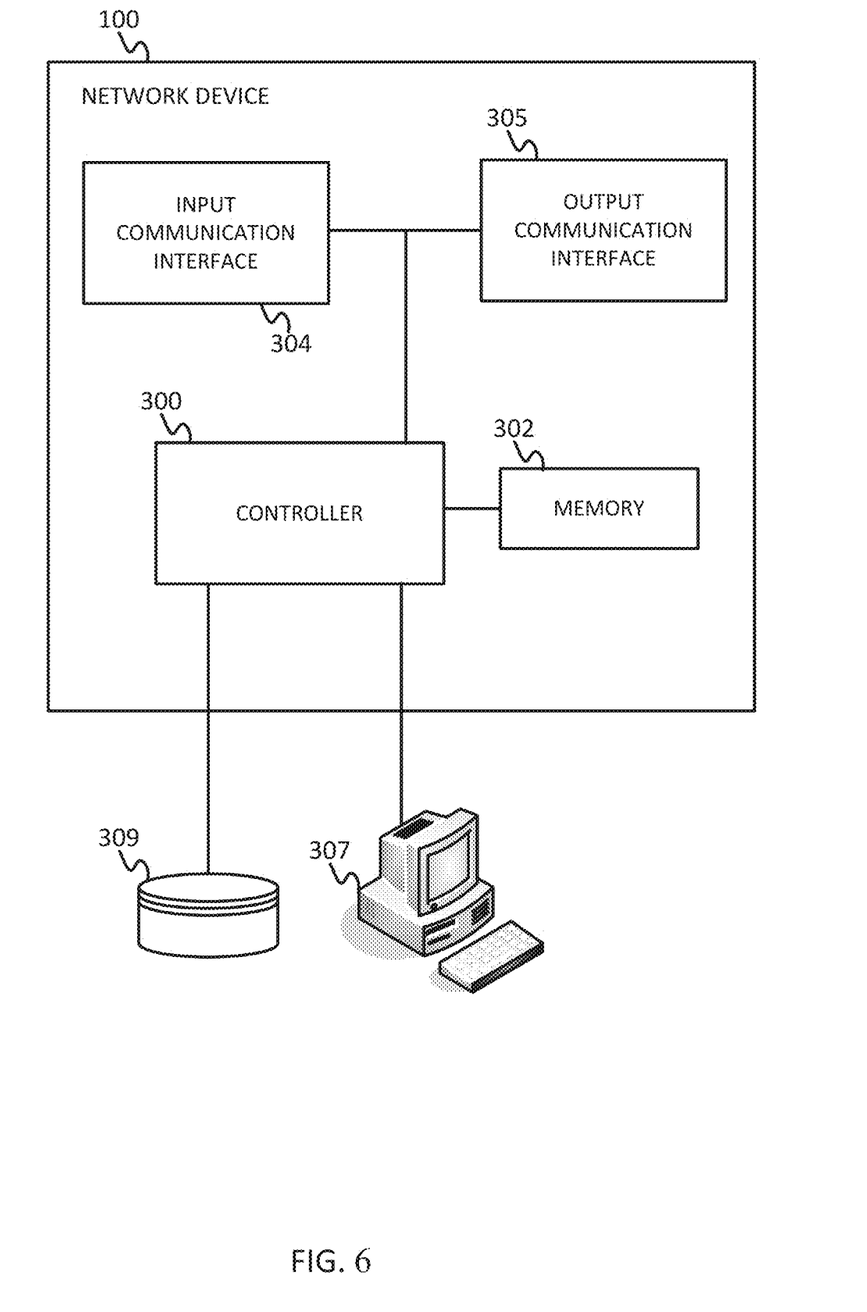
FIG. 6 illustrates an example network device for computing virtualization.

FIG. 6 illustrates an example network device 401 configured to run one or more virtual machines. An example of the network device 401 is the host 101. The network device 401 includes at least a controller 300, a memory 302, an input communication interface 304, and an output communication interface 305. The network device 401 may also communicate with a workstation 307 and a database 309. Additional, different, or fewer components may be provided.

The memory 302 is configured to store a physical fingerprint of the network device 401. The physical fingerprint includes one or more of the physical characteristics described above. The physical fingerprint may be set at a time the power of the network device 401 is turned on, a time when the network device 401 is booted, or periodically updated. The memory 302 also periodically stores current values for the physical characteristics. The current values are collected according to a predetermined interval or schedule.

The controller 300 is configured to monitor the physical characteristics as received from the virtual machine. When a specified number of physical characteristics deviate from the physical fingerprint the controller identifies a migration of the virtual machine, and begins to monitor the configuration characteristics of the virtual machine. If the migration is permissible, little or no configuration characteristics change because the virtual machine has likely been moved between physical servers on the same network.

The controller 300 is configured to monitor configuration characteristics of the virtual machine by comparing current values of the configuration characteristics to a baseline set of configuration characteristics. The controller 300 identifies unauthorized usage of the virtual machine when the current values of the configuration characteristics deviate from the configuration profile. The deviation may be variably set as any number of the configuration characteristics.

The memory 302 may be configured to store the parameters, thresholds, and characteristics according to the following definitions. Any file or format system may be used. For example, an original physical configuration file (e.g., fp_orig_phsicaln) stores each of the parameters from the original physical information for each of the virtual machines. The original physical configuration file may be recorded when a new license is installed. A configuration fingerprint file (e.g., fp_orig_confign) stores each of the configuration characteristics of the last valid configuration, which may be the original configuration. The configuration fingerprint file may be recorded when a new license is installed and updated whenever the configuration changes while remaining on a valid physical machine.

The current physical information file (e.g., fp_current_physicaln) includes the current values of the physical parameters. The current physical information file may be recorded when a new license is installed and updated whenever a move is detected (by comparing against the last contents of current physical information file.) The current configuration footprint file (e.g., fp_current_confign) includes the current configuration characteristics. The current configuration footprint file is recorded when a new license is installed and updated whenever the configuration changes (by comparing against the last contents of current configuration footprint file.)

A history of configuration changes file (e.g., fp_config_historyn) includes a log of the configuration changes since the license was installed. The history of configuration changes file may be accessed for diagnostic purposes. The history of physical changes file (fp_physical_historyn) includes a long of the physical changes since the license was installed. The history of physical changes file may be accessed to recognize when a move to a physical machine (that is not the original machine) should still be considered as valid due to being preceded and followed by valid machines. The network device may define or adjust the threshold level for determine virtual machine migration according to the data collected in the history of physical changes file. Any instance in the history may be used as the reference for determining change.

The value n is a counter that begins at 0 and is incremented each time a new UDI is obtained or a new license is installed. Thus, when such an event occurs, a new set of files is created but the existing files are retained for troubleshooting and diagnostic purposes. In one example, a maximum (e.g., 5, 10) for the number of retained file sets is defined in the memory 302. The network device may also be configured to maintain up to 64 histories of virtual machines, as well as 64 configuration change events. In one example, this data is designed to take less than 32 kilobytes of memory, but may be configured to various sizes.

The controller 300 may be configured to run an operating system (e.g., Linux, Windows NT). The operating system runs software requested by the user device. The operating system may also run management software as described above.

The controller 300 may include a general processor, digital signal processor, an application specific integrated circuit (ASIC), field programmable gate array (FPGA), analog circuit, digital circuit, combinations thereof, or other now known or later developed processor. The controller 300 may be a single device or combinations of devices, such as associated with a network, distributed processing, or cloud computing.

The memory 302 may be a volatile memory or a non-volatile memory. The memory 302 may include one or more of a read only memory (ROM), random access memory (RAM), a flash memory, an electronic erasable program read only memory (EEPROM), or other type of memory. The memory 302 may be removable from the network device 101, such as a secure digital (SD) memory card. The memory 302 may be permanent, such as a hard drive, solid state drive, or other storage device.

In addition to ingress ports and egress ports, the input communication interface 304 and the output communication interface 305 may include any operable connection. An operable connection may be one in which signals, physical communications, and/or logical communications may be sent and/or received. An operable connection may include a physical interface, an electrical interface, and/or a data interface.

Figure 7:
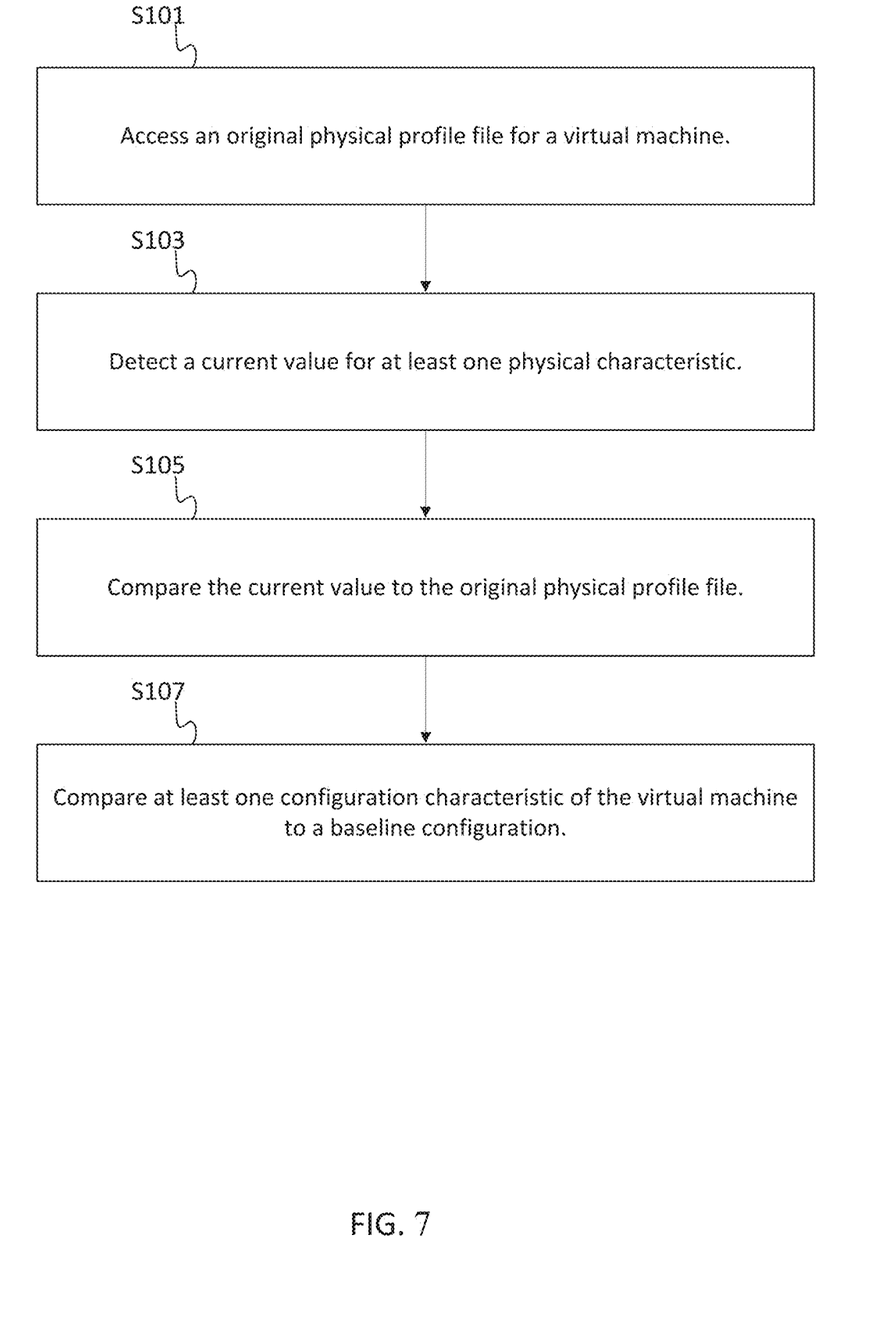
FIG. 7 illustrates an example flowchart for detecting unauthorized copy of a virtual machine.

FIG. 7 illustrates an example flowchart for detecting an unauthorized copy of a virtual machine. The process of the flowchart may be performed by the network device implementing the virtual machine, controller 300, or a controller of another server separated from the network device, which may be referred to alternatively as the controller in the following description.

At S101, the controller accesses an original or other reference physical profile file, which may be referred to as a baseline, for a virtual machine. The virtual machine may be created in response to a local network offloading hardware or other resources to a remote server. The original physical profile file includes physical attributes of the remote server that are visible to the virtual machine. The original physical profile file may be created with the virtual machine, when the virtual machine is booted up, or when the physical server is booted up.

The reference physical profile file may include any combination of addresses, model numbers of hardware resources, serial numbers of hardware resources, or quantities of hardware resources. The guest operating system of the virtual machine has accesses to these physical characteristics through the hypervisor, which may be referred to characteristics that bleed through to the guest. Many hypervisors (e.g., VMWare ESX, Citrix XEN, Linux KVM) pass these physical characteristics by default.

At S103, the controller detects current values for a subset of the physical characteristics. The current values are collected after the reference physical profile file has been created. At S105, the controller compares the current values to the reference physical profile file, which may occur periodically (e.g., every minute, hour, day) or occur in response to software on the virtual machine checking a license authorization. If there are any changes, or more than a predetermined number of changes, the controller monitors configuration characteristics of the virtual machine. Change may indicate a migration or copying.

At S107, in response to a difference between the current values and the original physical profile file, the controller compares at least one configuration characteristic of the virtual machine to a baseline configuration. The configuration comparison may determine whether the migration is authorized. The configuration characteristics include settings for the virtual machine that are not expected to change much after initial provisioning or are to change in expected ways. In the example of the virtual machine running a virtual router, the configuration characteristics may include IP addresses, username, passwords, time zone, interfaces, or any combination thereof.

The baseline configuration may be stored when the virtual machine is configured, when the virtual machine is booted up, when the physical server is booted up, or when a license for software on the virtual machine is enabled. In addition, the baseline configuration may be updated. For example, as long as no changes to the physical characteristics, configuration changes are added to the baseline configuration. The controller does not identify configuration changes until a migration has been detected from the physical characteristics. This way, as a system is provisioned, the configuration baseline is updated constantly while running on the initial physical host that the virtual machine was provisioned on.

The controller determines whether current values for configuration characteristics of the virtual machine are different that the baseline configuration. If too many configuration characteristics are different, the controller declares the virtual machine instance to be unauthorized. The controller may define too many configuration characteristics as a specific number of characteristics or a percentage of characteristics. When the virtual machine instance is unauthorized, the controller may generate an invalidation command that is configured to initiate an unauthorized state, brick the virtual machine, disable features, or any combination thereof.

The network may include wired networks, wireless networks, or combinations thereof. The wireless network may be a cellular telephone network, an 802.11, 802.16, 802.20, or WiMax network. Further, the network may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method, executed by a processor, comprising: in response to deployment of a virtual machine, generating a physical profile for the virtual machine, wherein the physical profile includes a stored value for at least one physical characteristic of a network device associated with the virtual machine:
storing the physical profile for the virtual machine at a remote server:
accessing a current value of the at least one physical characteristic; comparing the current value of the at least one physical characteristic to the stored value of the at least one physical characteristic;
identifying a migration of the virtual machine based on a difference between the current value of the at least one physical characteristic and the stored value of the at least one physical characteristic:
when the migration of the virtual machine is identified, transitioning the virtual machine to a restricted state:
when in the restricted state: accessing at least one network connection configuration characteristic of the virtual machine based on the migration of the virtual machine; and comparing, using the processor, the at least one network connection configuration characteristic of the virtual machine to an expected value for the at least one network connection configuration characteristic, wherein the expected value for the at least one network connection configuration characteristic is based on a prior configuration stored at the remote server,
wherein the network connection configuration characteristic includes a numerical value that describes a quantity of physical network interfaces of the network device, wherein a first of the physical network interfaces is assigned a first media access control (MAC) address and a second of the physical network interfaces is assigned a second MAC address, wherein the first physical network interface and the second physical network interface are interfaces of a same type;
generating, using the processor, a warning message for an endpoint indicative of an error when the at least one network connection configuration characteristic of the virtual machine differs from the expected value for the at least one network connection configuration characteristic; and
disabling the virtual machine by removing physical resources assigned to the virtual machine when the at least one configuration characteristic of the virtual machine differs from the expected value for the at least one network connection configuration characteristic.

2. The method of claim 1, wherein the at least one physical characteristic includes interface information, address information, identity information, processor performance information, or virtual machine identification information.

3. The method of claim 1, wherein the current value is a first value, the method further comprising: accessing a second value of the at least one physical characteristic; comparing the current value of the at least one physical characteristic to the stored value of the at least one physical characteristic; and identifying a return of the virtual machine when the current value of the at least one physical characteristic matches the stored value of the at least one physical characteristic.

4. The method of claim 1, further comprising:
updating the expected value for the at least one network connection configuration characteristic before the migration of the virtual machine is identified.

5. The method of claim 1, wherein the at least one physical characteristic includes a processor model number.

6. The method of claim 1, wherein the at least one network connection configuration characteristic of the virtual machine includes interface parameters, address parameters, processor parameters, memory parameters, geographic parameters, virtual machine parameters, and user parameters.

7. The method of claim 1, wherein the at least one network connection configuration characteristic is one of a plurality of physical characteristics, the method further comprising:
performing a comparison of each of the plurality of physical characteristics to a reference physical profile file; and
determining a compliance value from the comparisons of each of the plurality of physical characteristics to a reference physical profile file,
wherein the warning message is based on the compliance value being less than a threshold.

8. The method of claim 1, wherein the numerical value in the network connection configuration characteristic includes reflects two or more physical interfaces.

9. An apparatus comprising:
a storage device to store a physical fingerprint of a network device associated with a virtual machine and a configuration profile associated with operation of the virtual machine, wherein the physical fingerprint includes stored values for a plurality of physical characteristics of the network device; and
a processor to generate the physical fingerprint of the network device in response to deployment of the virtual machine:
the processor is further configured to identify a first weight for a first characteristic of the plurality of physical characteristics and a second weight for a second characteristic of the plurality of physical characteristics, wherein the first weight and the second weight are unequal;
the processor further configured to monitor the plurality of physical characteristic as received from the virtual machine with respect to the configuration profile,
the processor is further configured to identify a migration of the virtual machine when a combination of the first and second weights for each of the plurality of physical characteristic
deviates from an expected value of the plurality of physical characteristics, wherein the expected value is based on a prior configuration of physical characteristics of the virtual machine;
when the processor identifies the migration of the virtual machine, the processor is further configured to transition the virtual machine to a restricted state;
when in the restricted state, the processor is further configured to monitor at least one network configuration characteristic of the virtual machine as one of the plurality of physical characteristics at a predetermined periodic time interval to identify unauthorized usage of the virtual machine when the at least one network configuration characteristic deviates from the configuration profile; and when unauthorized usage of the virtual machine is identified, the processor is further configured to disable the virtual machine by removing physical resources assigned to the virtual machine.

10. The apparatus of claim 9, wherein the at least one physical characteristic includes interface information, address information, identity information, processor performance information, or virtual machine identification information.

11. The apparatus of claim 9, wherein the processor is configured to generate a warning message based on unauthorized usage of the virtual machine.

12. The apparatus of claim 9, wherein the first characteristic describes a number of Ethernet interfaces.

13. The apparatus of claim 12, wherein the second characteristic describes a time zone of the network device.

14. The apparatus of claim 13, wherein the first weight for the number of Ethernet interfaces is different than the second weight for the time zone.

15. A non-transitory computer readable medium containing instructions that when executed are configured to:

in response to deployment of a virtual machine, generate a reference physical profile file for the virtual machine, wherein the reference physical profile file includes values of physical characteristics of a physical device running the virtual machine:

store the reference physical profile file for the virtual machine at a remote server:

access the reference physical profile file for a virtual machine detect a current value for a plurality of physical characteristics; assign a first weight to a first characteristic of the plurality of physical characteristics; assign a second weight to a second characteristic of the plurality of physical characteristics;

perform a weighting algorithm to unequally weigh the first weight of the first characteristic and the second weight of the second characteristic;

compare the current values for each of the plurality of physical characteristics to the reference physical profile file;

generate a compliance value based on the first and second weights for the number of current values for the plurality of physical characteristics that are different than a corresponding expected physical characteristic of the reference physical profile file and based on the weighting algorithm, wherein the corresponding expected physical characteristic of the reference physical profile file is based on a prior configuration of the virtual machine stored at the remote server:

identify a migration of the virtual machine based on the compliance value:

when there is a migration of the virtual machine, transition the virtual machine to a restricted state: when in the restricted state, compare the compliance value of the virtual machine to a threshold value to identify unauthorized usage of the virtual machine; and when unauthorized usage of the virtual machine is identified, disable the virtual machine by removing physical resources assigned to the virtual machine.

16. The non-transitory computer readable medium of claim 15, wherein the instructions are configured to:

in response to the comparison of the compliance value and the threshold value, generating an invalidation command.

17. The non-transitory computer readable medium of claim 16, wherein the invalidation command is configured to disable the virtual machine.

18. The non-transitory computer readable medium of claim 15, wherein the first characteristic describes a number of Ethernet interfaces and the second characteristic describes a time zone.

19. The non-transitory computer readable medium of claim 18, wherein the first weight for the number of Ethernet interfaces is different than the second weight for the time zone.

20. The non-transitory computer readable medium of claim 15, wherein the first physical characteristic includes interface information, address information, identity information, processor performance information, or virtual machine identification information.

* * * * *

UNITED STATES PATENT AND TRADEMARK OFFICE
CERTIFICATE OF CORRECTION

PATENT NO. : 10,180,851 B2
APPLICATION NO. : 13/740441
DATED : January 15, 2019
INVENTOR(S) : Jeffrey David Haag et al.

Page 1 of 1

It is certified that error appears in the above-identified patent and that said Letters Patent is hereby corrected as shown below:

In the Claims

Claim 1, Column 15, Line 19, please replace "machine:" with --machine;--
Claim 1, Column 15, Line 21, please replace "server:" with --server;--
Claim 1, Column 15, Line 29, please replace "characteristic:" with --characteristic;--
Claim 1, Column 15, Line 31, please replace "state:" with --state;--

Claim 9, Column 16, Line 45, please replace "machine:" with --machine;--
Claim 9, Column 16, Line 54, please replace "profile," with --profile;--

Claim 15, Column 17, Line 32, please replace "machine:" with --machine;--
Claim 15, Column 17, Line 34, please replace "server:" with --server;--
Claim 15, Column 17, Line 36, please replace "machine" with --machine;--
Claim 15, Column 18, Line 12, please replace "server:" with --server;--
Claim 15, Column 18, Line 14, please replace "value:" with --value;--
Claim 15, Column 18, Line 16, please replace "state:" with --state;--

Signed and Sealed this
Sixteenth Day of April, 2019

Andrei Iancu
*Director of the United States Patent and Trademark Office*